United States Patent
Sato

(10) Patent No.: US 9,505,155 B2
(45) Date of Patent: Nov. 29, 2016

(54) INJECTION MOLDING APPARATUS

(75) Inventor: Toshiomi Sato, Fujinomiya (JP)

(73) Assignee: SATOSEIKI CO., LTD., Fujinomiya-shi (JP)

( * ) Notice: Subject to any disclaimer, the term of this patent is extended or adjusted under 35 U.S.C. 154(b) by 0 days.

(21) Appl. No.: 14/344,725

(22) PCT Filed: Oct. 4, 2011

(86) PCT No.: PCT/JP2011/005589
§ 371 (c)(1),
(2), (4) Date: Sep. 22, 2014

(87) PCT Pub. No.: WO2013/051055
PCT Pub. Date: Apr. 11, 2013

(65) Prior Publication Data
US 2015/0050382 A1  Feb. 19, 2015

(51) Int. Cl.
*B29C 45/02*    (2006.01)
*B29C 45/18*    (2006.01)
*B29C 45/46*    (2006.01)
*B29C 45/53*    (2006.01)
(Continued)

(52) U.S. Cl.
CPC ......... *B29C 45/1808* (2013.01); *B29C 45/03* (2013.01); *B29C 45/462* (2013.01); *B29C 45/531* (2013.01); *B29C 45/74* (2013.01)

(58) Field of Classification Search
CPC .................................................. B29C 45/462
USPC ................................ 425/542, 589, 574, 576
See application file for complete search history.

(56) References Cited

U.S. PATENT DOCUMENTS

| 3,195,185 A | * | 7/1965 | Goffin et al. ............... 425/190 |
| 4,111,623 A | * | 9/1978 | Black ................ B29C 45/1459 425/576 |
| 6,153,141 A | | 11/2000 | Kim et al. |

(Continued)

FOREIGN PATENT DOCUMENTS

| JP | U-1-95314 | 6/1989 |
| JP | A-07-290492 | 11/1995 |

(Continued)

OTHER PUBLICATIONS

Office Action issued in Japanese Application No. 2010-170509 dated May 27, 2014 (with translation).

(Continued)

*Primary Examiner* — Jill Heitbrink
(74) *Attorney, Agent, or Firm* — Oliff PLC

(57) ABSTRACT

A small sized injection molding machine by which a molded product can be produced with a desired level of precision with simple control. An injection molding machine with: a longitudinal injection cylinder to which stick-shaped molding materials are sequentially supplied in line from the upper side, the lower end of which is formed into a nozzle shape, and the lower side of which is constituted by a material having a good heat retaining property; a heater which heats the lower portion of the injection cylinder; and a pressing shaft which presses the stick-shaped molding materials downward. When the stick shaped-molding material located at the uppermost side is pressed by the pressing shaft, the molding material located at the lowermost side which has already been completely melted, is injected into a cavity, and the heat from the heater is transmitted to the die side through a nozzle touch portion.

9 Claims, 13 Drawing Sheets

(51) Int. Cl.
  *B29C 45/03* (2006.01)
  *B29C 45/74* (2006.01)

(56) References Cited

U.S. PATENT DOCUMENTS

| | | | | |
|---|---|---|---|---|
| 7,494,332 B2* | 2/2009 | Galomb | ............... | B29C 45/03 425/574 |
| 8,070,469 B2* | 12/2011 | Galomb | ............... | 425/162 |
| 8,616,871 B2* | 12/2013 | Galomb | ............... | 425/162 |
| 8,727,765 B2* | 5/2014 | Fiore | ............... | 425/542 |

FOREIGN PATENT DOCUMENTS

| JP | A-8-197569 | 8/1996 |
|---|---|---|
| JP | A-10-146858 | 6/1998 |
| JP | A-2003-276068 | 9/2003 |
| JP | A-2005-260026 | 9/2005 |
| JP | A-2008-302634 | 12/2008 |
| JP | A-2010-260297 | 11/2010 |

OTHER PUBLICATIONS

International Search Report issued in International Patent Application No. PCT/JP2011/005589 dated Jan. 10, 2012 (with translation).
Written Opinion issued in International Patent Application No. PCT/JP2011/005589 dated Jan. 10, 2012 (with translation).
International Preliminary Report on Patentability issued in International Patent Application No. PCT/JP2011/005589 dated Jan. 21, 2014 (with partial translation).
Apr. 13, 2015 Search Report issued in European Application No. 11 87 3742.8.

* cited by examiner

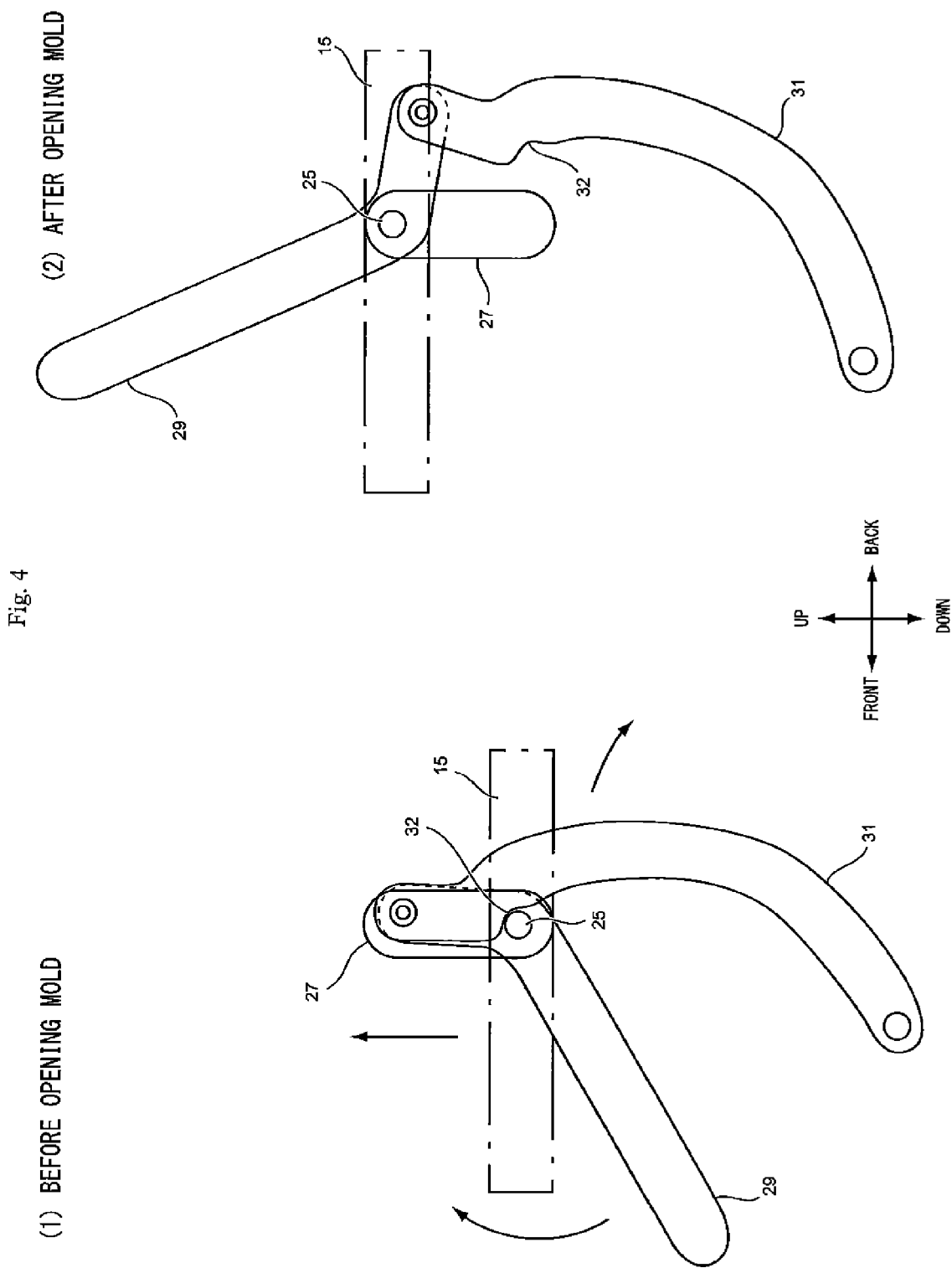

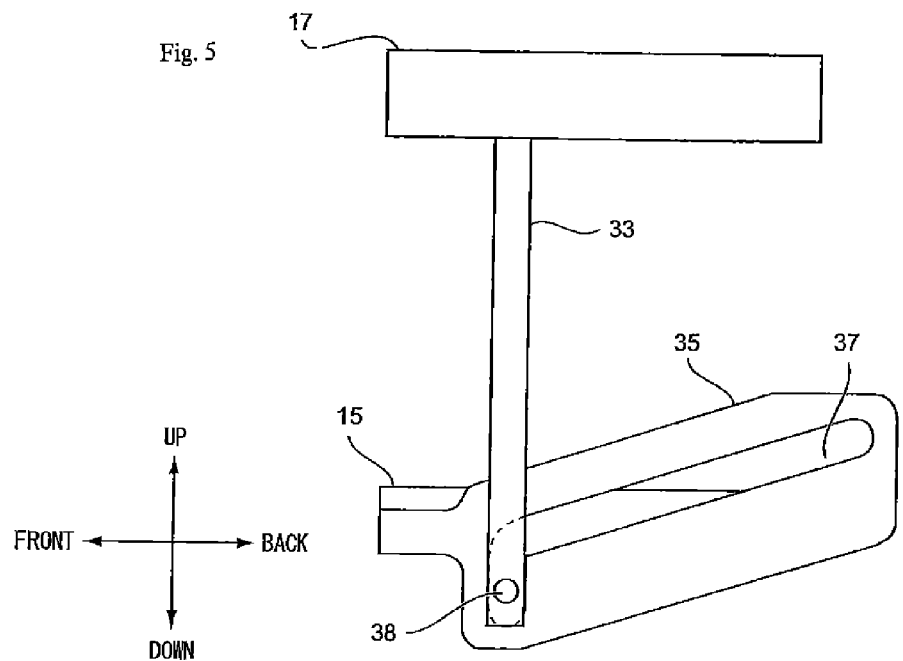
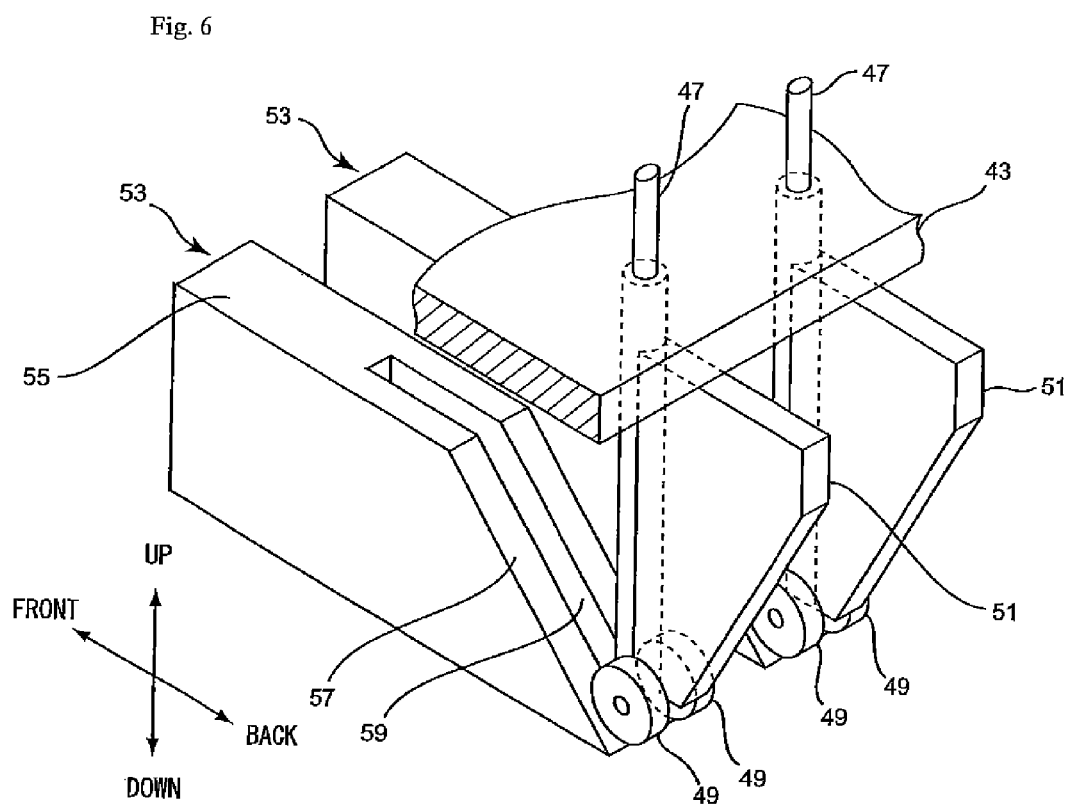

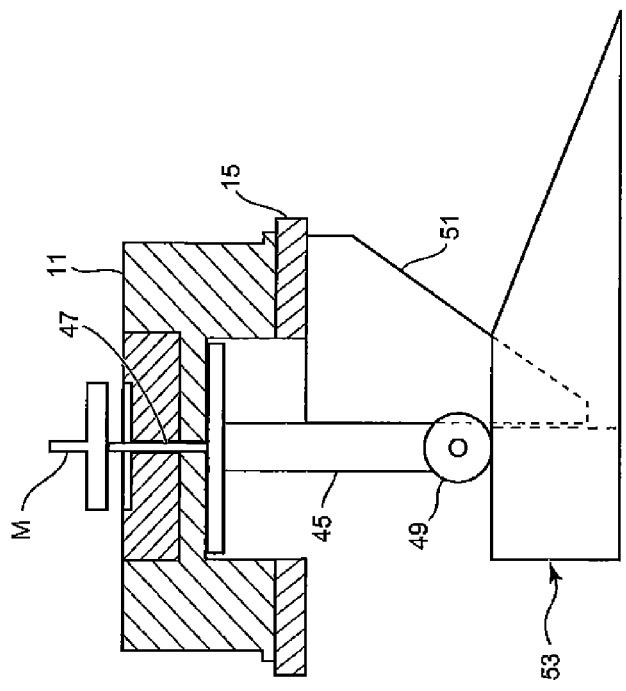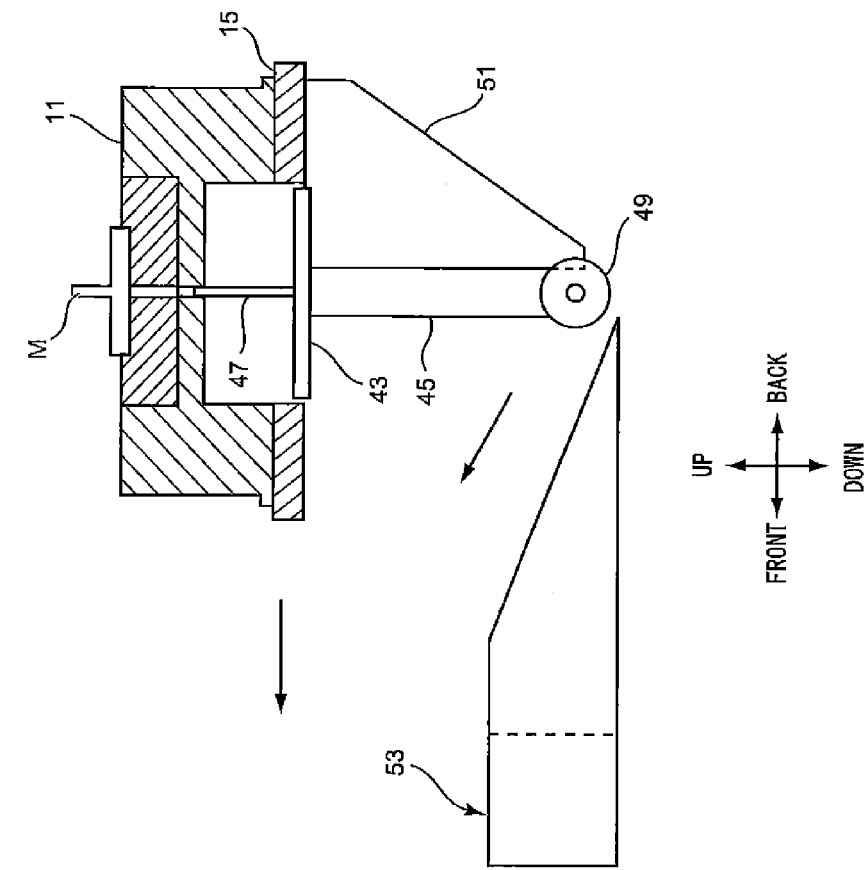

INJECTION MOLDING APPARATUS

TECHNICAL FIELD

The present invention relates to a downsized and simplified injection molding apparatus.

BACKGROUND ART

In a related-art injection molding apparatus, a synthetic resin molding material, which has been supplied from a hopper in a form of pellets and the like, is plasticized and molten in a heating cylinder, then, is carried by a screw and injected to a mold cavity to be molded. Then, after the molding is solidified, the mold is opened and the molding is pushed out by an ejector pin.

In the above injection molding apparatus, the heating cylinder and the mold are separated, and the structure and molding conditions are independently devised from an aspect of control so that the optimum performance is fulfilled in both components, therefore, the entire apparatus has become large in size as well as the control of molding conditions has become complicated.

CITATION LIST

Patent Literature

Japanese Laid Open Patent Literature 1: JP-A-2008-302634

SUMMARY OF INVENTION

Technical Problem

Recently, labor and costs for transport of moldings are becoming problems, and it has been proposed that the transport itself is not performed by manufacturing the necessary number of moldings according to need by the place of each end user. However, it is difficult to respond to the above proposal because of reasons such that the related-art injection molding apparatus has been large in size.

The present invention has been made in view of the above problems, and an object thereof is to provide an injection molding apparatus capable of reducing the size as well as manufacturing moldings with a desired accuracy under simple control, which will be installed in the place of the end user in future.

Another object of the present invention is to provide a stick-shaped molding material suitable for the above injection molding apparatus.

Solution to Problem

The present invention has been made for solving the above problems, and there is provided a first aspect of an injection molding apparatus comprising: a mold including a lower-side mold and an upper-side mold forming a cavity with the lower-side mold; a vertical injection cylinder having a nozzle in a lower end, to which stick-shaped molding materials are sequentially supplied in line from the upper side; a heating means generating a temperature gradient in which the temperature increases from above to below inside the injection cylinder; and a push-in means including a push-in shaft pushing the stick-shaped molding materials downward in the injection cylinder, wherein, when the stick-shaped molding material in the highest level is pushed by the push-in shaft, the molding material in the lowest level, which has been completely molten, is injected to the cavity, and heat is transmitted from the injection cylinder to the mold through a nozzle touch from the nozzle.

There is provided a second aspect of the injection molding apparatus according to a first aspect, wherein the push-in shaft includes a centering mechanism.

There is provided a third aspect of the injection molding apparatus according to the second aspect, wherein the push-in shaft includes an upper-side shaft and a lower-side shaft, with the lower-side shaft entering into a lower, cylindrical portion of the lower-side shaft from the lower end, and being supported to the upper-side shaft such that the lower-side shaft moves freely in a horizontal direction and a vertical direction relatively to the upper-side shaft, and the lower-side shaft being elastically fit into a low end side of the upper-end shaft in a radial direction.

There is provided a fourth aspect of the injection molding apparatus according to any one of the first to third aspects, further comprising: an ejector mechanism, in which an ejector pin rises by the rising of the guide rod, the ejector mechanism having a guide rod having a pair of wheels provided on right and left both sides thereof, a rear stopper plate fixed to a lower-side mold attachment board and abutting on the rear side of the guide rod, and a guide path having a pair of inclined paths provided in parallel right and left and a concave portion provided therebetween, wherein, when the guide rod is pushed by the rear stopper plate from the rear side, the wheels climb up while rolling on the inclined paths so that the guide rod rises with respect to the rear stopper plate, whereas the rear stopper plate itself enters the concave portion.

There is provided a fifth aspect of the injection molding apparatus according to any one of the first to fourth aspects, wherein the push-in shaft comes down by manual operation of a push-in lever.

There is provided a sixth aspect of the injection molding apparatus according to the fifth aspect, wherein a reservoir is provided below a gate of the upper-side mold, and a piston biased upward is housed in the reservoir.

There is provided a seventh aspects of the injection molding apparatus according to any one of the first to sixth aspects, wherein the injection cylinder and the mold are made of plural materials having different heat conductivities, which are respectively heated by heat from a heater, and it is adjustable that a period of time taken until the stick-shaped molding material, after having come to the lowest level by the push of the push-in shaft, is changed to a completely molten state is approximately equal to a period of time taken until the molding material is solidified, after having been injected into the cavity.

There is provided an eighth aspect of a stick-shaped molding material to be supplied to an injection cylinder of an injection molding apparatus according to any one of the first to seventh aspects, having an approximately columnar shape, wherein many concave grooves extending in an axis line direction are formed on an outer peripheral surface thereof.

There is provided a ninth aspect of the stick-shaped molding material according to the eighth aspect, wherein a volume thereof is adjusted to correspond to a volume of a piece of final molding.

The injection molding apparatus according to the present invention enables apparatus size reduction and simple control manufacturing of moldings with a desired accuracy.

BRIEF DESCRIPTION OF DRAWINGS

FIG. 4 are explanatory views of a mold, particularly, a drive mechanism of an upper-side mold of the injection molding apparatus of FIG. 1.

FIG. 5 is an explanatory view of a mold, particularly, a drive mechanism of a lower-side mold of the injection molding apparatus of FIG. 1.

FIG. 6 is a perspective view of an ejector mechanism of the injection molding apparatus of FIG. 1.

FIG. 7 are explanatory views of the ejector mechanism of FIG. 6.

DESCRIPTION OF EMBODIMENTS

An injection molding apparatus 1 according to an embodiment of the present invention will be explained with reference to the drawings.

Figure 1:
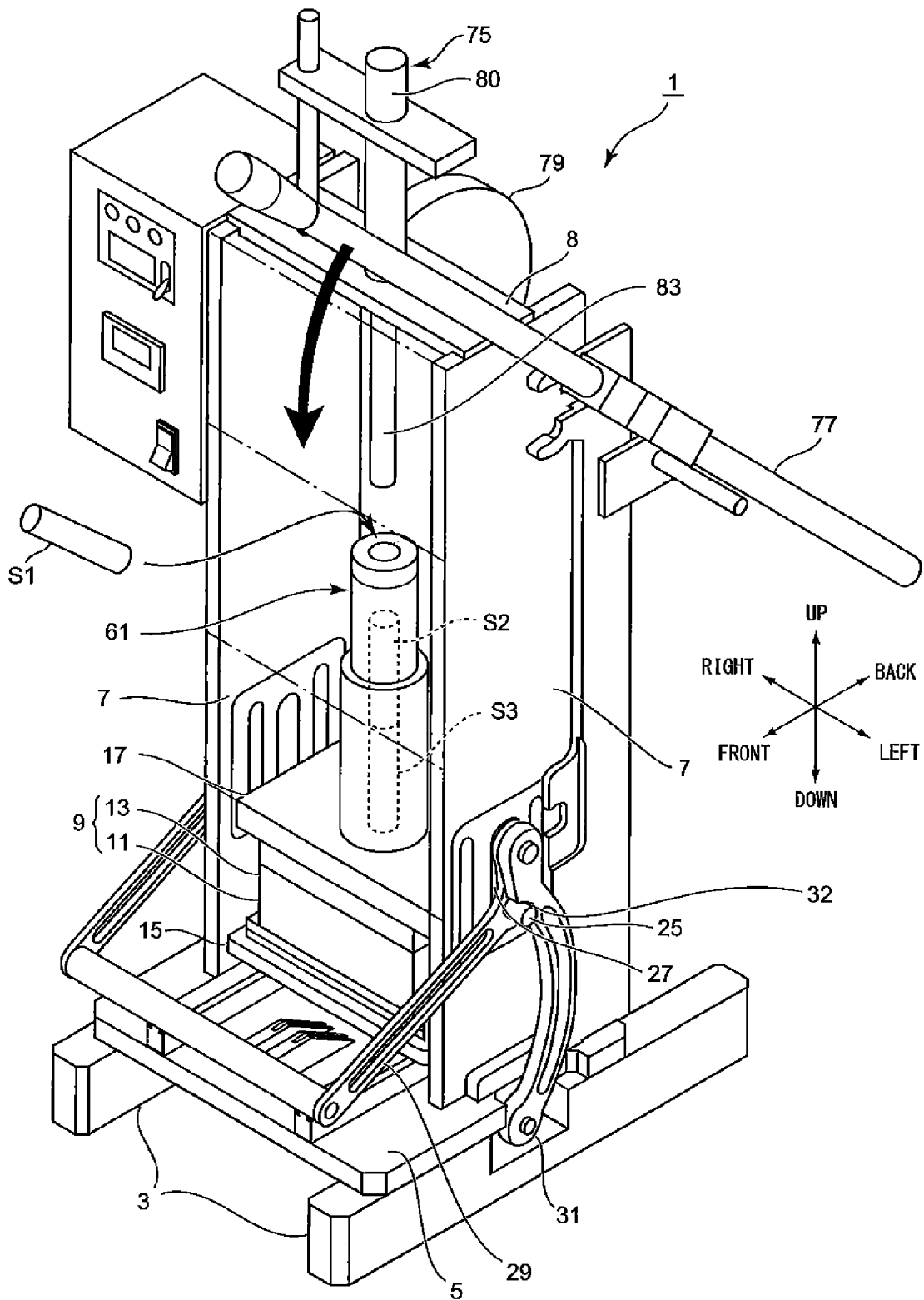
FIG. 1 is a perspective view of an injection molding apparatus according to an embodiment of the present invention.

In FIG. 1, numerals 3, 3 denote a pair of leg portions and a mounting base 5 is fixed on the pair of leg portions 3, 3. A pair of side plates 7, 7 is installed to stand on right and left both end sides of the mounting base 5 so as to be parallel to each other. In the side plates 7, 7, plate surfaces face right and left directions, and front and back directions in which the side plate 7 does not exist are opened. A top plate 8 is disposed between upper end surfaces of the side plates 7, 7.

In a space surrounded by the mounting base 5, the right and left side plates 7, 7 and the top plate 8, a mold 9 and an injection cylinder 61 are arranged, in which the injection cylinder 61 is positioned above the mold 9.

A section of the mold 9 will be explained at the beginning.

First, the structure of the mold 9 will be explained.

Figure 2:
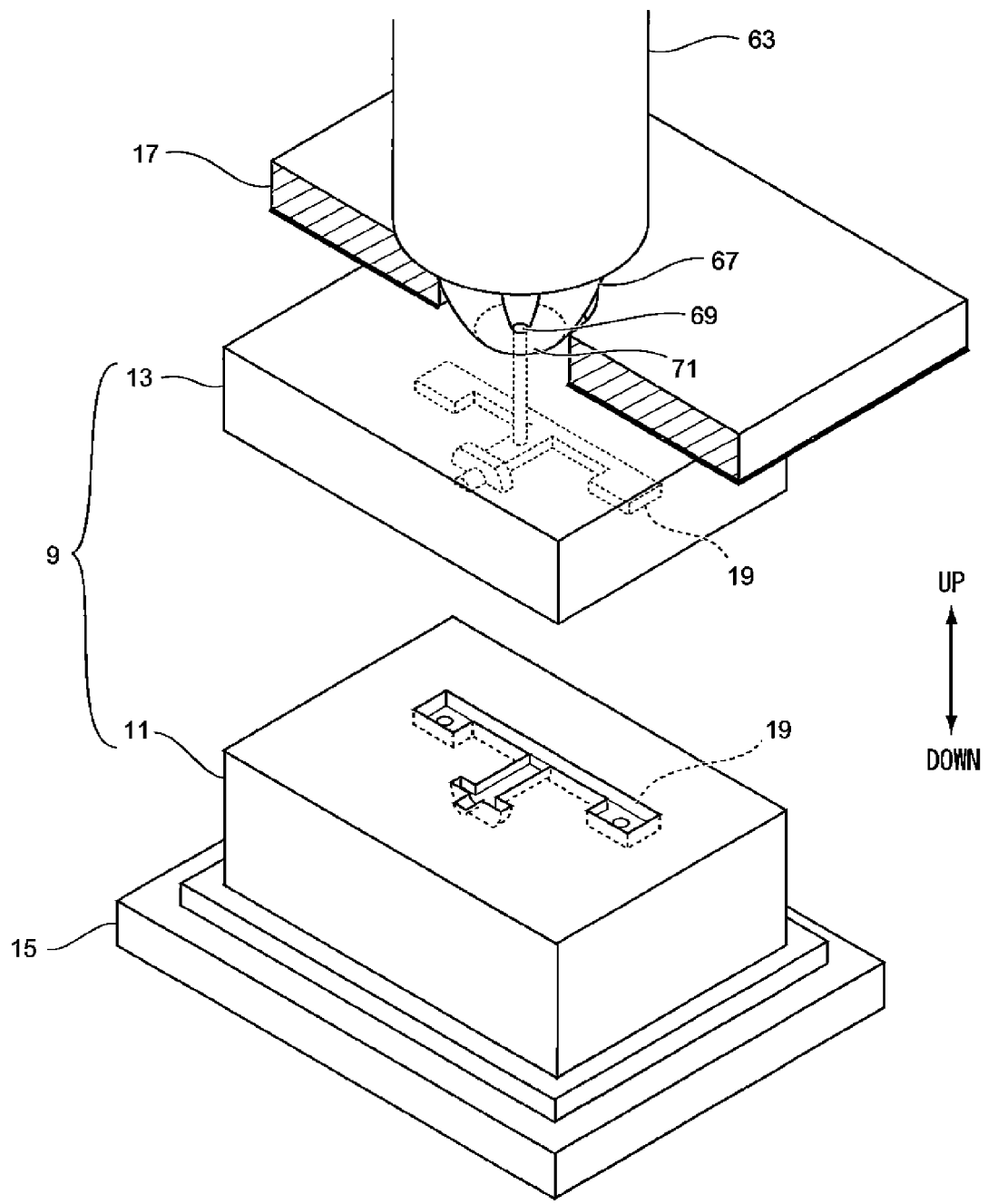
FIG. 2 is a partially-exploded perspective view of the injection molding apparatus of FIG. 1.

As shown in FIG. 2, a fixed lower-side mold 11 and a movable upper-side mold 13 are provided as the mold 9, which are respectively attached to a lower-side mold attachment board 15 and an upper-side mold attachment board 17 so as to be arranged between these boards.

Figure 3:
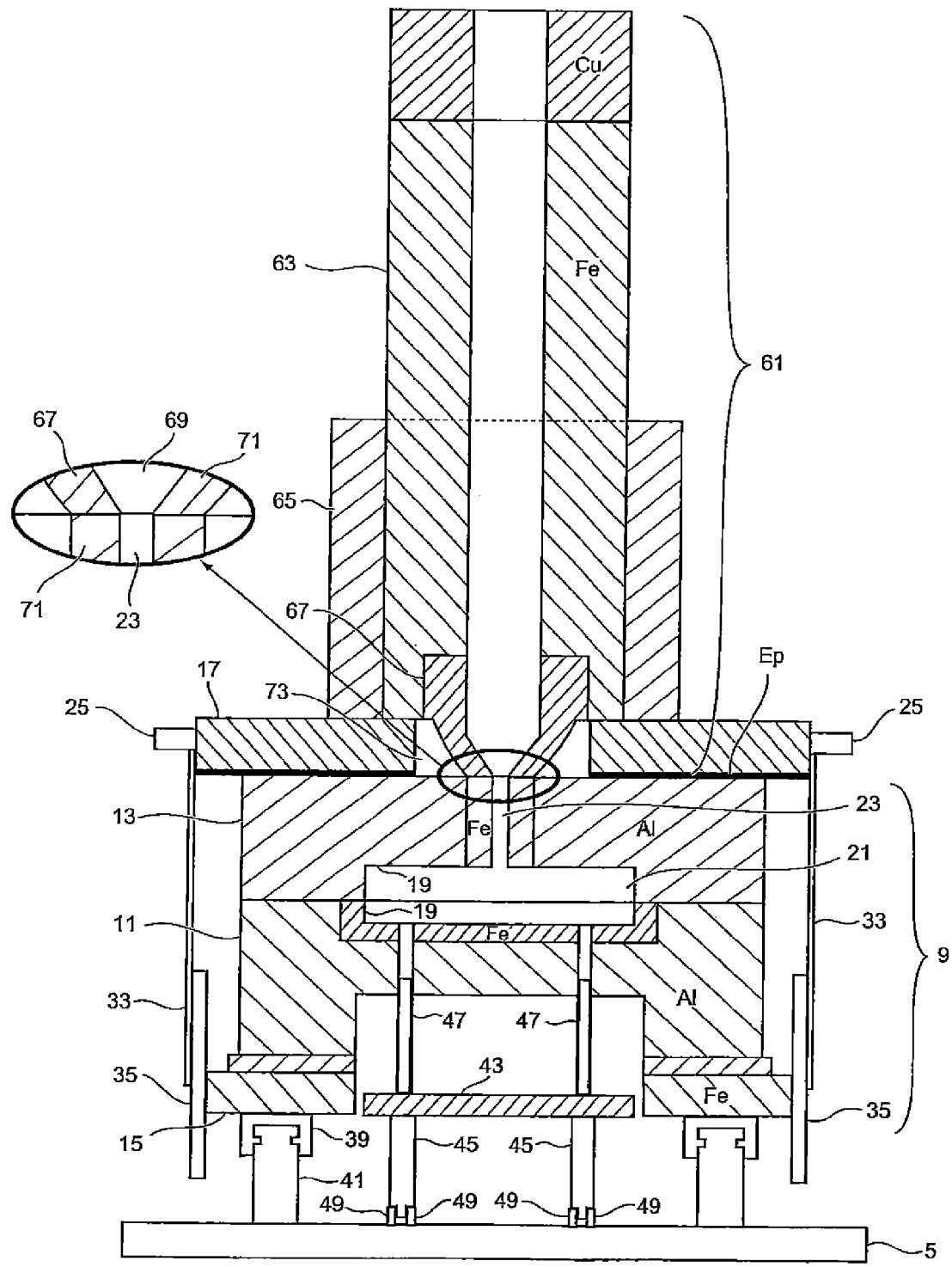
FIG. 3 is a cross-sectional view of an internal portion of side plates of the injection molding apparatus of FIG. 1.

When the molds are clamped, concave portions 19 of the lower-side mold 11 and the upper-side mold 13 are sealed to form a cavity 21 as shown FIG. 3. The cavity 21 is shaped in accordance with the shape of a molding. A gate 23 communicating with the cavity 21 is provided in the upper-side mold 13. The gate 23 extends to pierce the upper-side mold 13 in the vertical direction. At four corners on an upper surface of the lower-side mold 11, positioning pins are respectively provided though not shown.

A part around the concave portion 19 of the lower-side mold 11 and a part around the gate 23 of the upper-side mold 13 are made of iron (Fe) having a good heat retaining property, that is, having a relatively poor heat conductivity, and other parts are made of aluminum (Al) having a good heat radiation property, namely, having a relatively good heat conductivity.

The lower-side mold attachment board 15 is made of iron (Fe) and the upper-side mold attachment board 17 has a two-layer structure, in which a thick upper-layer portion occupying the most of the upper-side mold attachment board 17 is made of iron (Fe) and a thin lower-layer portion is made of epoxy glass (Ep) having a good heat insulation property.

As described later, heat is transmitted first to the gate 23, then, the heat is transmitted to surrounding portions from there. The portions around the gate 23 and the concave portion 19 of the lower-side mold 11 are made of iron (Fe) having a good heat retaining property and other portions are made of aluminum (Al) having a good heat radiation property, therefore, a molten molding material flows into the cavity 21 from the gate 23 smoothly and sufficiently, and the material is rapidly cooled after the material sufficiently flows in.

Next, a drive mechanism of the mold 9 will be explained.

As shown in FIG. 3, support shafts 25, 25 respectively project from right and left both sides of the upper-side mold attachment board 17, and respective support shafts 25 extend outward through long holes 27 extending in the vertical direction of respective side plates 7 as shown in FIG. 1.

A numeral 29 denotes a handle. The handle 29 has a C-shaped bar as a whole, and slightly bends in folding directions both end sides thereof. The handle 29 is arranged so as to surround the right and left side plates 7, 7 from the front side, and the support shafts 25 pierce the bending portions at both end sides and fixed.

Guide arms 31, 31 are respectively connected to both end sides of the handle 29 so as to turn freely by pin connection. Each guide arm 31 bends in an arc shape and swells backward, and a lower end thereof extends to a cutout portion of the leg portion 3 through a cutout portion of the mounting base 5, being connected by the pin in the cutout portion so as to turn freely. In each guide arm 31, a concave portion 32 is formed in the front side, and the support shaft 25, which is projecting outward, enters the concave portion 32 from the front side to be engaged.

As a slide guide mechanism (not shown) is provided between the side plate 7 and the upper-side mold attachment board 17, the upper-side mold attachment board 17 can relatively move with respect to the side plates 7 smoothly.

Accordingly, when the handle 29 is lifted up as shown in FIG. 4, respective guide arms 31 slightly turn backward and respective support shafts 25 are released from the engaged state and move upward in the long holes 27. Due to the movement, the upper-side mold 13 moves upward with the upper-side mold attachment board 17 connected to the support shafts 25 to open the mold.

Next, the relation between the upper-side mold attachment board 17 and the lower-side mold attachment board 15 will be explained.

As shown in FIG. 5, lifting and lowering shafts 33 are respectively attached to right and left both sides of the upper-side mold attachment board 17. Cam plates 35 are respectively attached to right and left both sides of the lower-side mold attachment board 15. A cam groove 37 of the cam plate 35 in the vertical direction at the front side and is inclined from the extended upper portion toward the back side in an oblique upward direction. A cam follower 38, which is freely fit to the cam groove 37, is connected to the lower end side of the lifting and lowering shaft 33.

Accordingly, when the upper-side mold attachment board 17 moves upward, the lower-side mold attachment board 15 on which the lower-side mold 11 is mounted is drawn forward due to the cam mechanism.

A pair of slide rails 39, 39 is attached to the undersurface of the lower-side mold attachment board 15. The pair of slide rails 39, 39 is respectively engaged with a pair of guide rails 41, 41 installed on the mounting base 5 so as to be smoothly guided in the front and back directions in a sliding manner.

An ejector mechanism for ejecting a molding M is provided in the lower-side mold 11. In the ejector mechanism, there are provided an ejector plate 43 placed in parallel to a lower surface of the lower-side mold 11 which is opposite to the side where the cavity 21 is formed, two guide rods 45 installed to stand below the undersurface of the ejector plate 43 at an interval to each other and ejector pins 47 installed to stand on an upper surface of the ejector plate 43. The ejector pins 47 pierce the lower-side mold 11 so as to slide freely, and tips thereof form the same planes as the surface of the concave portion 19 for forming the cavity 21 in a standby state, which configure a surface of the molding.

A pair of wheels 49, 49 are attached on right and left both sides of a lower end portion of the guide rod 45. Board thickness surfaces on the side portion side of rear stopper plates 51 abut on the rear side of the guide rods 45. The rear stopper plates 51 has an approximately triangle shape and are tapered toward lower portions, board thickness surfaces on the upper side thereof are fixed to the undersurface of the lower-side mold attachment board 15. The tapered lower ends of the rear stopper plates 51 enter between the pair of wheels 49, 49.

Numerals 53 denote guide paths, and the guide paths 53 are attached on the mounting base 5. The two guide paths 53 are positioned between the pair of guide rails 41, 41.

The guide paths 53 have a trapezoidal shape when seen from the right and left directions, in which upper surfaces 57 on the backside are inclined, and upper surfaces 55 on the front side are horizontal. The upper surfaces are rolling contact surfaces of the pair of wheels 49, 49.

In each guide path 53, a concave portion 59 piercing from the upper surface to a lower surface is formed. The concave portion 59 extends from the middle of the horizontal upper surface to the end of the back side. The concave portion 59 is a space where the above rear stopper plate 51 enters when drawn forward.

Accordingly, when the lower-side mold attachment board 15 is drawn forward, the guide rods 45 are pushed form the back side by the rear stopper plates 51 fixed to the lower-side mold attachment board 15. The wheels 49 climb up while rolling on the inclined upper surfaces 57 (inclined paths) of the guide paths 53, roll on the horizontal upper surfaces 55 as the wheels have climbed up there, and further travel forward. At that time, the rear stopper plates 51 themselves enter the concave portions 59, and when the front surfaces thereof abut on front surfaces of the concave portions 59, any further travelling is blocked.

As the rear stopper plates 51 push the rear side of the guide rods 45 over the entire length thereof, a drawing force to the front directly becomes a rolling contact force of the wheels 49, therefore, the wheels 49 climb up on the inclined upper surface 57 smoothly even when the drawing is performed with a light force. Additionally, the lower-side mold attachment board 15 is provided with the rear stopper plates 51 instead of a cylindrical flange, therefore, the guide rods 45 can be further elevated as the flange does not exist. Accordingly, the height of the entire injection molding apparatus 1 can be suppressed. Furthermore, as the rear stopper plates 51 enter the concave portions 59 and are guided when the wheels 49 roll forward, the guide rods 45 do not deviate right or left.

Figure 8:
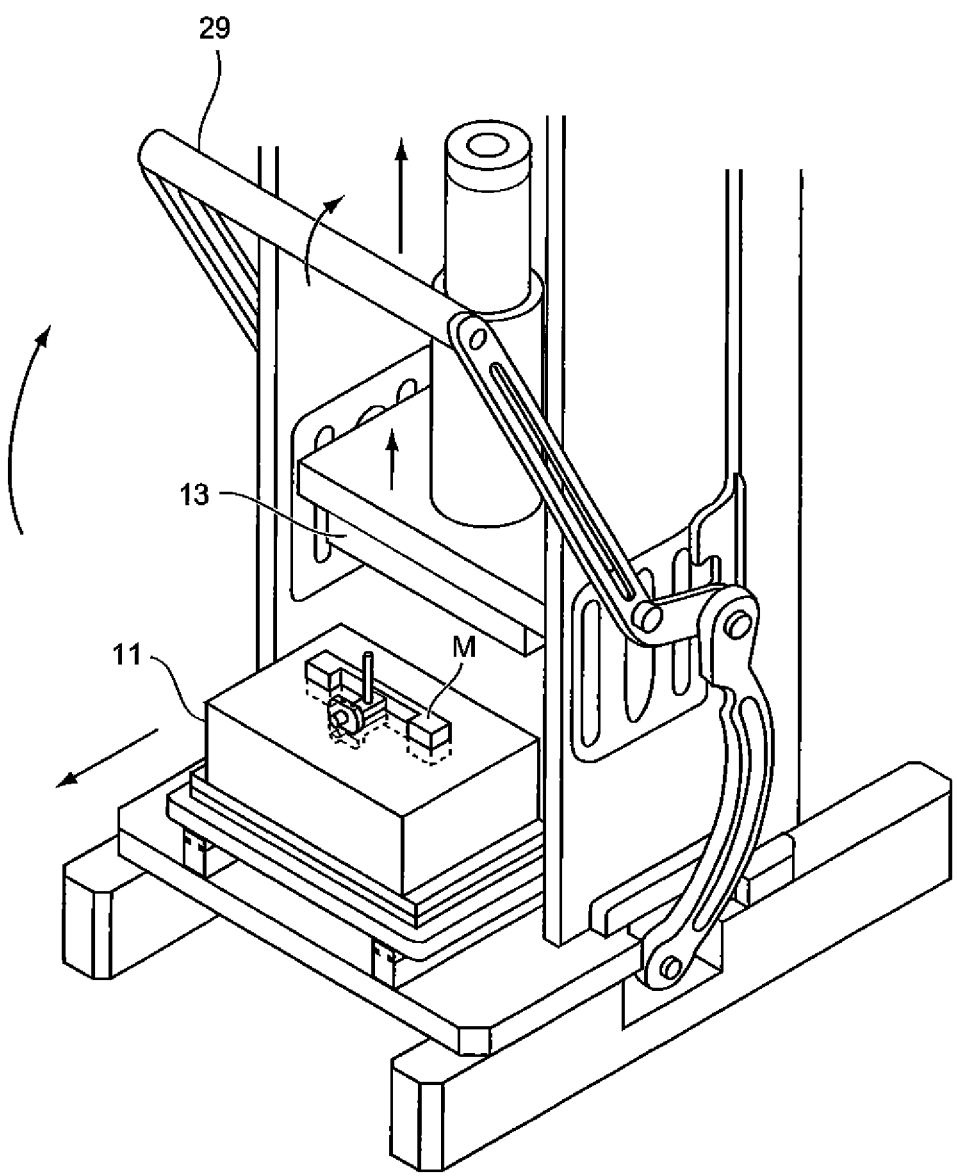
FIG. 8 is an explanatory view of operations of the mold opening and the drawing of the lower-side mold of the injection molding apparatus of FIG. 1.

According to the above structure, when the handle 29 is lifted upward as shown in FIG. 8, the upper-side mold 13 moves upward and opens, and the lower-side mold 11 is drawn forward, then, the molding M, which has been cooled and solidified, is ejected by the ejector pins 47 and taken out from the concave portion 19.

Next, a section of the injection cylinder 61 will be explained.

As shown in FIG. 3, a cylinder body 63 is installed to stand on the upper-side mold attachment board 17. The cylinder body 63 has a two-stage structure, in which an upper side is made of copper (Cu) having a better heat radiation property than iron (Fe), and a lower side is made of iron (Fe). Then, a cylindrical heater 65 is fitted to the lower half on the lower side from the outside. Accordingly, as the temperature is the lowest in the copper (Cu) portion on the upper side in the cylindrical body 63, the molding material is not molten when the material is inserted there. As the portion surrounded by the heater 65 in the lower side is heated most strongly, the molding material coming down there is completely molten.

A nozzle 67 is connected to the lower end side of the cylinder body 63, which is made of iron (Fe). A peripheral edge defining a nozzle hole 69 of the nozzle 67 has a flat end surface 71. As shown in FIG. 2, the nozzle 67 enters a through hole 73 which pierces vertically and formed in the upper-side mold attachment board 17, and the flat surface 71 around the nozzle hole 69 is faced to and pressure-welded on the upper surface of the upper-side mold 13, which configures a so-called nozzle touch mechanism.

A material agitation body (not shown) is put in the cylinder body 63.

The nozzle hole 69 is communicated to the gate 23, and the completely molten molding material is injected from the nozzle hole 69 toward the cavity 21 through the gate 23.

As the lower layer side of the upper-side mold attachment board 17 is made of epoxy glass (Ep) having a good heat insulation property, heat can be transmitted between the injection cylinder 61 and the mold 9 only through the nozzle touch portion. Heat quantity transmitted from the injection cylinder 61 to the mold 9 is increased when the area of the flat surface 71 is increased and reduced when the area of the flat surface 71 is reduced, therefore, the heat quantity to be transmitted can be increased/reduced by increasing and reducing the area.

Next, a push-in means will be explained.

In the FIG. 1, a numeral 75 denotes a push-in shaft, and the push-in shaft 75 pierces through a through hole of the top plate 8 disposed between the upper end surfaces of the pair of side plates 7, 7. A rack (not shown) is attached to the back surface side of the push-in shaft 75.

A numeral 77 denotes a push-in lever, and the push-in lever 77 is connected to a support shaft (not shown). The support shaft is horizontally arranged between the pair of side plates 7, 7, and the right-side end portion thereof pierces the side plate 7 and projects outward. The push-in lever 77 is connected to the support shaft at the projecting right-end portion. The support shaft is provided with a pinion 79. The pinion 79 is engaged with the rack near the push-in shaft 75, strictly, the rack near an upper-side shaft 80.

According to the above structure, when a head portion of the push-in lever 77 is grasped and leaned in a counter-clockwise direction as shown by an arrow in FIG. 1, the push-in shaft 75 comes down due to a rack-pinion mechanism. The push-in lever 77 is biased in a direction turning in a clockwise direction, therefore, when a hand is released from the push-in lever 77, the push-in lever 77 rises and the push-in shaft 75 rises at the same time.

Next, a structure of the push-in shaft 75 will be explained with reference to FIG. 9 (1).

The push-in shaft 75 includes a large-diameter upper-side shaft 80 and a small-diameter lower-side shaft 83.

A lower half portion of the upper-side shaft 80 has a cylindrical shape, and a support pin 81 is fixed so as to be horizontally laid inside the cylinder. Moreover, an annular elastic member 82 is fixed on the lower-end side.

A through hole 84 piercing in the horizontal direction is formed in the lower-side shaft 83, and the through hole 84 extends long in the vertical direction.

A base end portion of the lower-side shaft 83 enters the inside of the cylinder of the upper-side shaft 80 from the lower side, and the support pin 81 is fitted freely in the through hole 84 so that the lower-side shaft 83 can relatively move in the vertical direction and the horizontal direction freely. The lower-side shaft 83 is fitted to the elastic member 82 so as to elastically contact the elastic member 82 in a radial direction.

Figure 9:
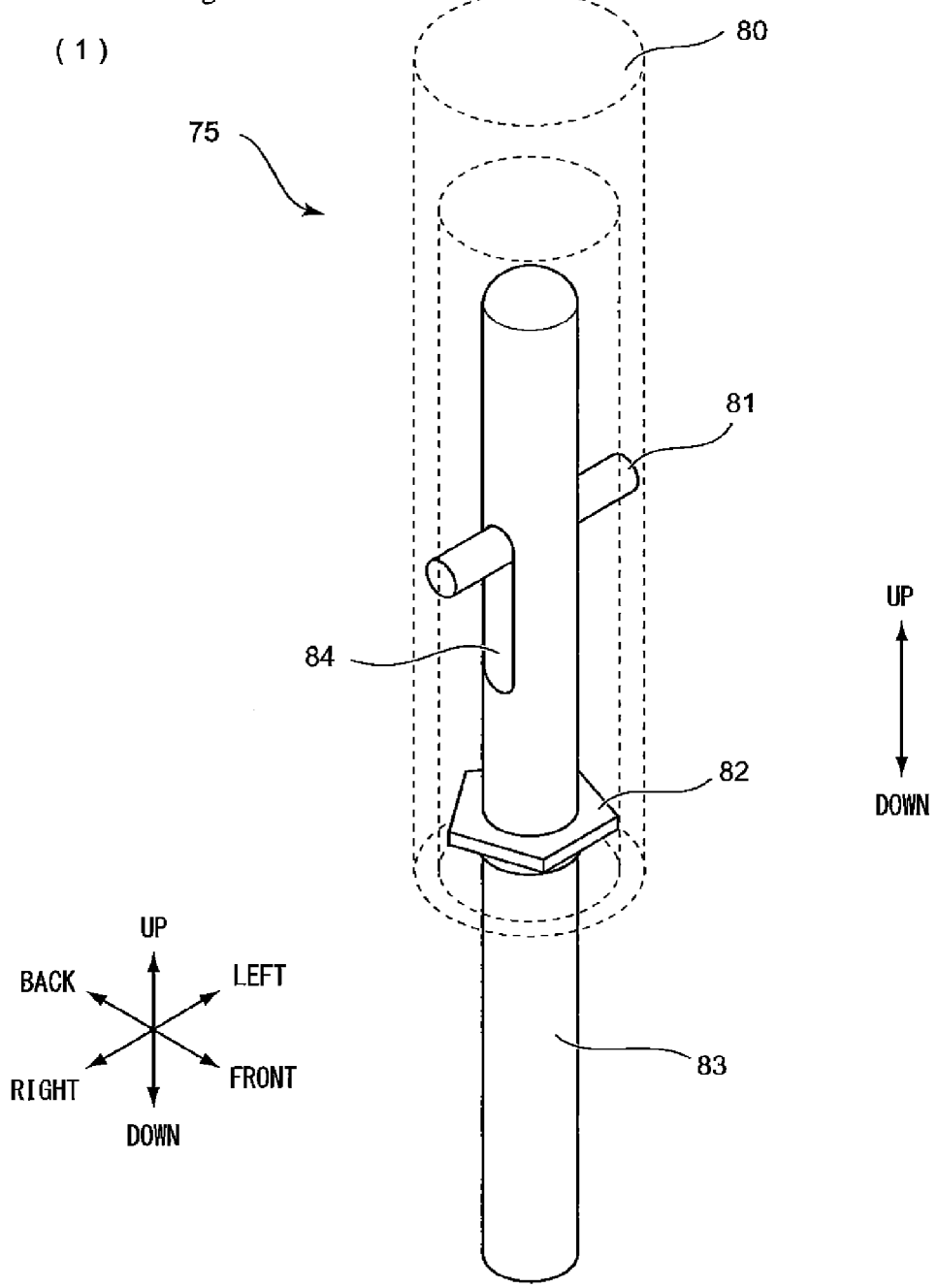
FIG. 9 are explanatory views of a structure of a push-in shaft of FIG. 1.

According to the above structure, the relative position of the lower-side shaft 83 with respect to the upper-side shaft 80 can be changed while elastically deforming the elastic member 82 as shown in FIG. 9 (2).

Accordingly, the lower-side shaft 83 of the push-in shaft 75 is centered with respect to the cylinder body 63 by escaping when abutting on an inner wall of the cylinder body 63, therefore, it is possible to prevent the lower-side shaft 83 of the push-in shaft 75 from scraping the inner wall of the cylinder body 63 even when there is a little design error or a certain degree of deformation occurs due to many used hours in the push-in shaft 75 or the cylinder body 63.

Next, a stick-shaped molding material S will be explained.

Figure 10:
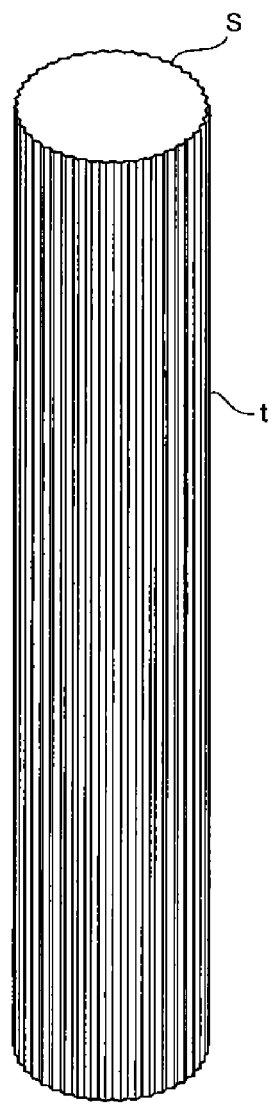
FIG. 10 is a perspective view of a stick-shaped molding material.

As shown in FIG. 10, the stick-shaped molding material S has an approximately columnar shape, and many concave grooves "t" extending in the axis line direction are formed on an outer peripheral surface thereof. A diameter and a length of the stick-shaped molding material S are set in consideration of an injection pressure and workability. The stick-shaped molding material S is not a final molding, the shape of which is a simple and does not require such high accuracy in size, therefore, mass production with a reasonable price is possible.

Figure 11:
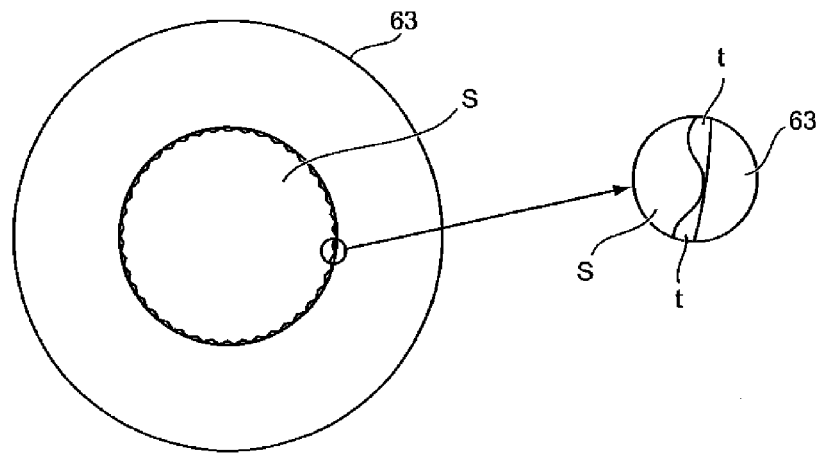
FIG. 11 is a cross-sectional view in a state where the molding material of FIG. 10 is inserted into a cylinder body.

As shown in FIG. 11, a diameter of the stick-shaped molding material S is set so as to be inserted with a slight gap remaining inside the cylinder body 63.

When the above-described device in the structure and the structural material are suitably combined, adequate heat can be given to necessary portions respectively in the section of the injection cylinder 61 and the section of the mold 9 by the output of one heater 65, and further, a period of time taken until the molding material coming to the lowest level of the injection cylinder 61 is completely molten into a hot-water state can be approximately equal to a period of time taken until the molding material injected into the mold 9 is cooled and solidified.

Next, a manual operation of the injection molding apparatus 1 and a forming process of the molding M will be explained with reference to FIG. 12 to FIG. 14.

Figure 12:
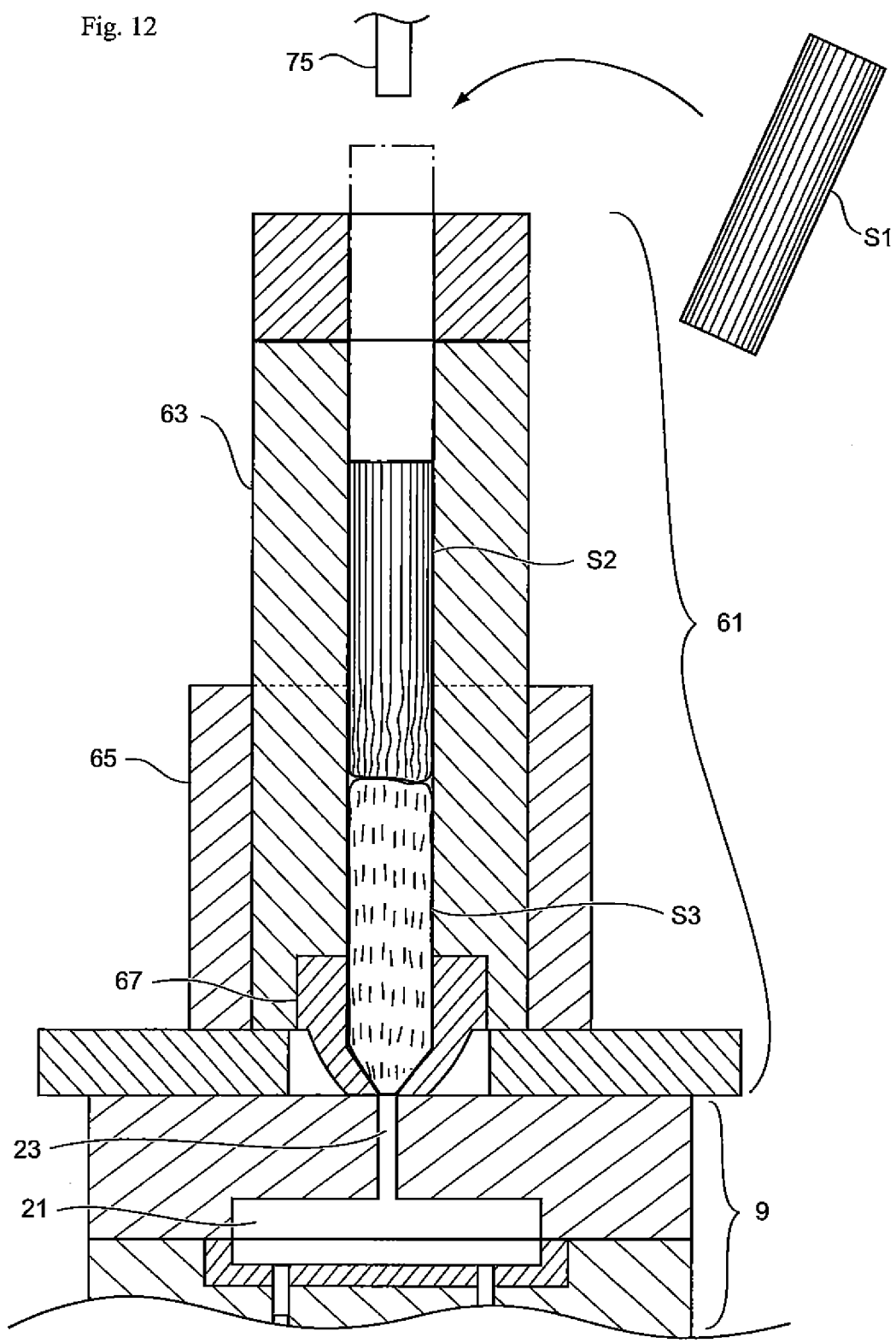
FIG. 12 is an explanatory view of a forming process of a molding M by the injection molding apparatus 1 of FIG. 1.

As shown in FIG. 12, when an operator supplies a stick-shaped molding material S1 to the cylinder body 63 of the injection cylinder 61 from the upper side by inserting the material by a hand, part of the material protrudes upward from the cylinder body 63. At that time, a molding material S2 in a middle level, which has been already supplied, is in a half-molten state in which the lower side is molten, and a molding material S3 in the lowest level is completely molten in the hot-water state.

Figure 13:
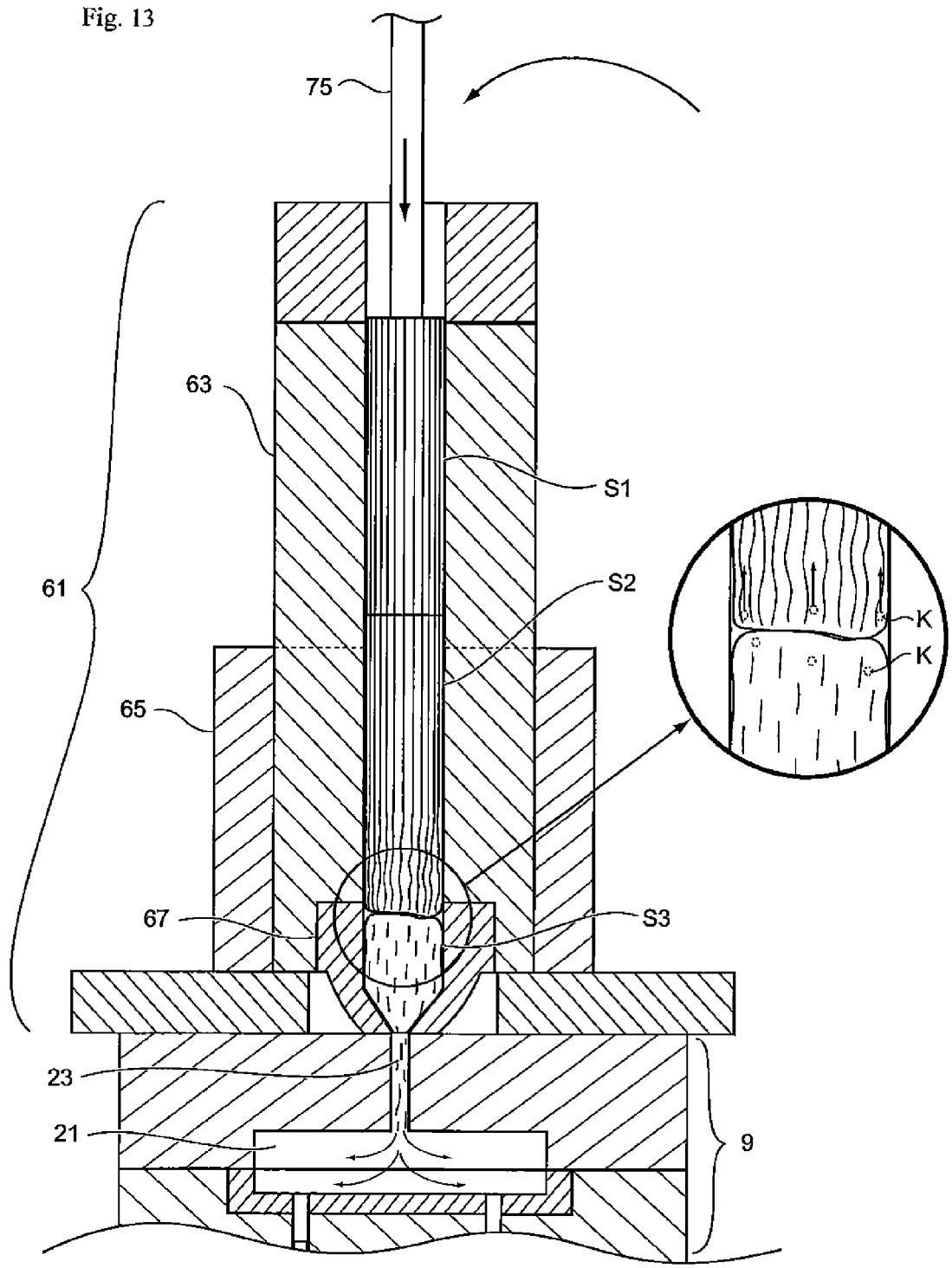
FIG. 13 is an explanatory view continued from FIG. 12.

As shown in FIG. 13, when the operator push the molding material S1 by operating the push-in lever 77 to allow the push-in shaft 75 to come down, the molding material S2 in the middle level pushes, as a piston, the molding material S3 which is completely molten in hot-water state to be injected into the mold 9. As the lower end side of the molding material S2 is molten and buries the space in the cylinder body 63 and the nozzle 67, the effect of an airtight stopper is high. Air (K) is being generated during being molten of the materials S1, S2. The air (K), upon generation, is immediately escaped upward through the concave grooves "t" of the molding materials S2, S3, therefore, the occurrence of voids in the molding M is significantly reduced.

Figure 14:
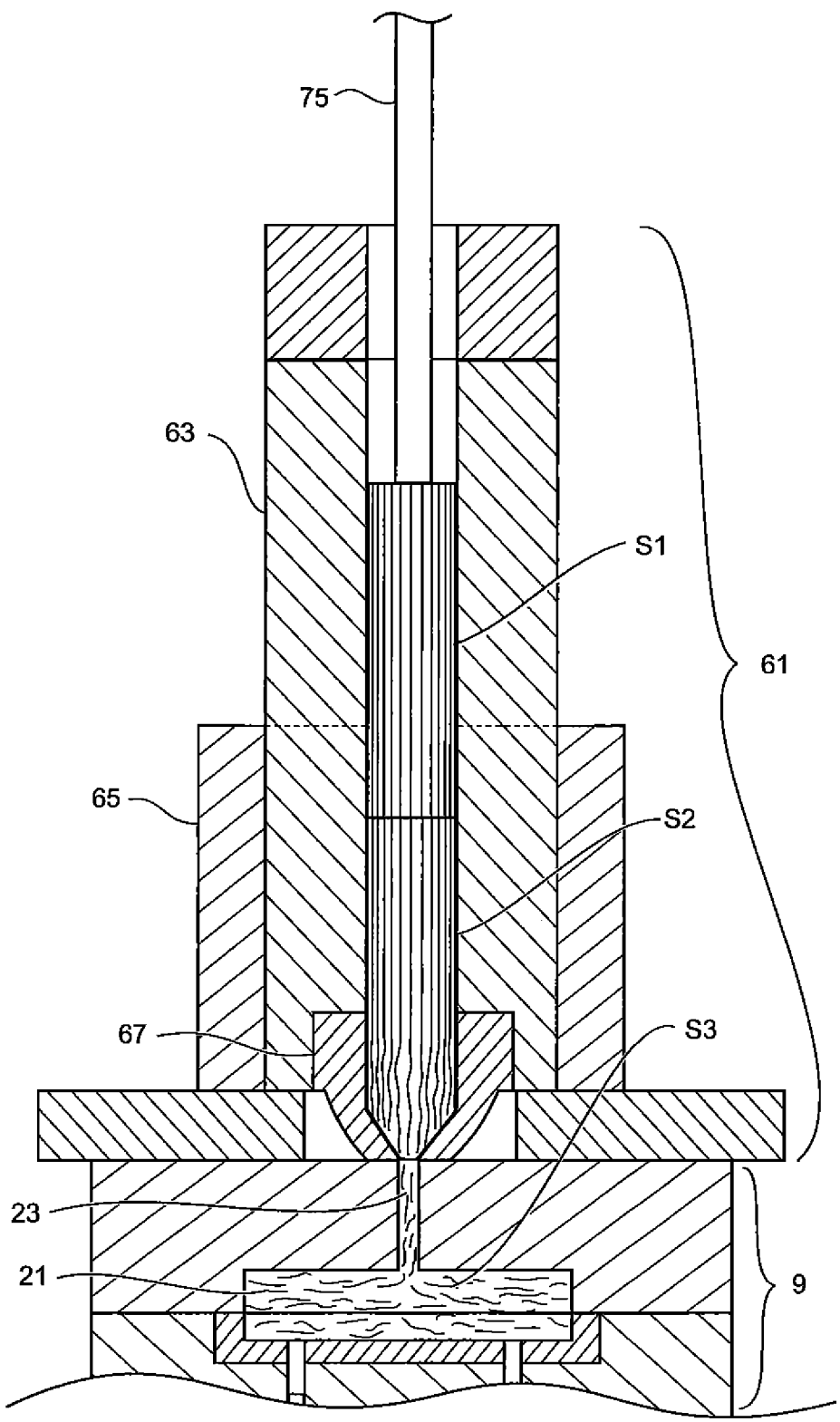
FIG. 14 is an explanatory view continued from FIG. 13.
Figure 15:
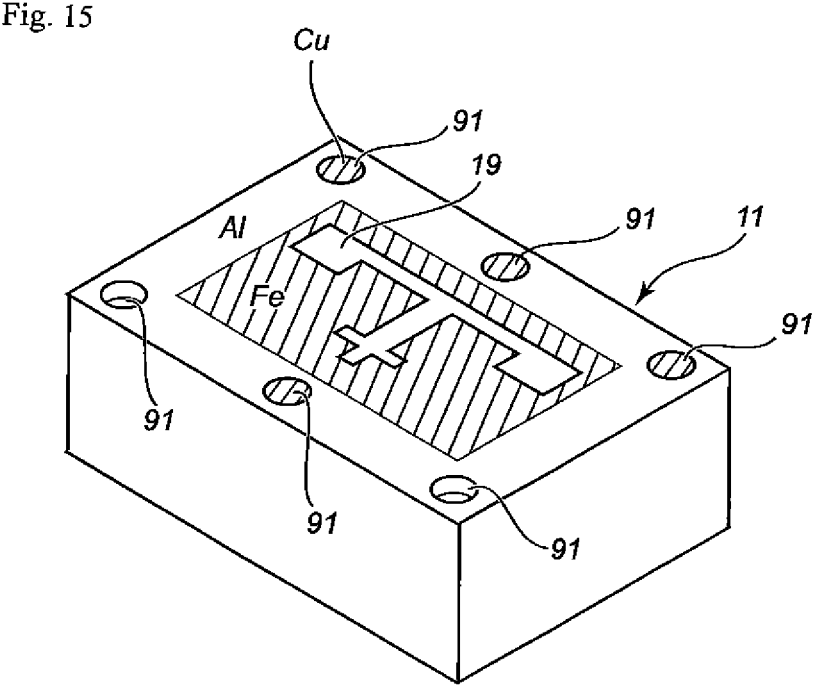
FIG. 15 is a perspective view of a lower-side mold having a different structure from FIG. 2.

As shown in FIG. 14, at the time when the injection of the molding material S3 is completed, the molding material S2 has moved to the place where the molding material S3 was positioned, then, the molding material is heated and molten completely into the hot-water state.

When the injection for one molding material to the mold 9 is completed, a buzzer (not shown) sounds and a timer (not shown) starts to measure time. Meanwhile, the operator inserts a molding material anew into the cylinder body 63. As the buzzer sounds again after a certain period of time passes, the operator waits for the buzzer, lifting the handle 29 upward to open the mold and take out the protruding molding M by picking it by fingers. Then, after returning the handle 29 to the original position, the operator operates the push-in shaft 75 again and repeats the above operation. Accordingly, the molding M will be sequentially manufactured.

In the injection molding apparatus 1, since the stick-shaped molding material S, which is an injected molding, with a prescribed volume is supplied in the injection cylinder 61, therefore, plasticization, mixing and even measurement are not necessary. Moreover, the push-in shaft 75 in the push-in means does not require such high heat resistance and high accuracy in size. Furthermore, the temperature of the entire apparatus can be controlled only by controlling the temperature of the heater 65. Additionally, the height is suppressed by devising an ejector mechanism in the section of the mold 9.

Accordingly, the apparatus can be drastically reduced in size and simplified in control successfully.

The embodiment of the present invention has been explained as the above, and specific structures are not limited to the embodiment and design alternations within a scope not departing from the gist of the invention are also included in the invention.

Though the above embodiment is the manual apparatus using the push-in lever 77, the apparatus can be an automatic system using an air cylinder.

The mold 9 is not limited to the above arrangement and types of materials, and for example, in the lower-side mold 11 of the mold 9, a part around the concave portion 19 is made of iron, an outer peripheral part thereof is made of aluminum, holes 91 are provided at an outer periphery thereof, and the holes 91 are filled with copper or are remained open, thereby changing thermal characteristics in respective parts in accordance with the shape of the molding, as a result, the entire molding which is sufficiently solidified can be obtained after a certain solidification time passes.

Figure 16:
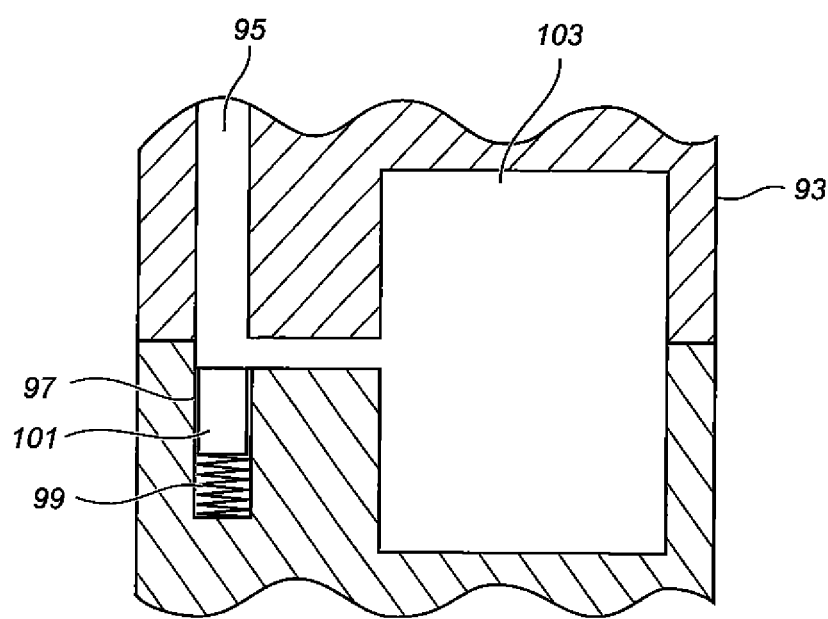
FIG. 16 is a partial cross-sectional view of a mold having a different structure from FIG. 3.

In the case where the push-in shaft 75 is lowered by the manual operation of the push-in lever 77, the mold 9 is floated and burrs are generated in the molding when the push-in pressure is increased too high by the operation of an unskilled operator. When a reservoir 97 is formed below a gate 95, as shown in FIG. 16, and a piston 101 to which a spring 99 is connected as a biasing means is housed there so as to slide freely in the vertical direction, excessive pressure is absorbed there and does not affect the cavity 103.

It is also conceivable that a push-in force by the push-in shaft is measured by a micro switch and so on and that lamps of red, yellow and so on are lighted when the force is too high based on a signal to thereby alert the operator.

Moreover, the volume of the stick-shaped molding material S is set to the approximately the same volume of the molding M, however, it is also possible to set the volume to a larger volume in consideration of work efficiency and so on.

INDUSTRIAL APPLICABILITY

The present invention can be used for a manufacturing industry which manufactures moldings by injection molding using a molding material.

REFERENCE SIGNS LIST 1 injection molding apparatus
3 (a pair of) leg portions
5 mounting base
7 (a pair of) side plates
8 top plate
9 mold
11 lower-side mold
13 upper-side mold
15 lower-side mold attachment board
17 upper-side mold attachment board
19 concave portion (of a cavity)
21 cavity
23 gate
25 support shaft
27 long hole
29 handle
31 guide arm
32 concave portion (of the guide arm)
33 lifting and lowering shaft
35 cam plate
37 cam groove
38 cam follower
39 (a pair of) slide rails
41 (a pair of) guide rails
43 ejector plate
45 guide rod
47 ejector pin
49 wheel
51 rear stopper plate
53 guide path
55 front-side horizontal upper surface
57 back-side inclined upper surface
59 concave portion
61 injection cylinder
63 cylinder body
65 heater
67 nozzle
69 nozzle hole
71 flat surface (of the nozzle)
73 through hole
75 push-in shaft
77 push-in lever
79 pinion
80 (push-in shaft) upper-side shaft
81 support pin
82 annular elastic member
83 (push-in shaft) lower-side shaft
84 through hole (of the lower-side shaft)
91 hole
93 mold
95 gate
97 reservoir
99 spring
101 piston
103 cavity
S stick-shaped molding material
t concave groove (of the molding material)
M molding
K air

The invention claimed is:

1. An injection molding apparatus comprising:
  a mold including a lower-side mold and an upper-side mold configured to form a cavity with the lower-side mold;
  a vertical injection cylinder having an upper portion, a lower portion and a nozzle disposed in a lower end of the lower portion, the injection cylinder configured to receive stick-shaped molding materials sequentially supplied in line from an upper end of the upper portion;
  a heater configured to generate a temperature gradient in the lower portion of the injection cylinder such that the temperature increases from above to below inside the lower portion of the injection cylinder, thereby changing sequentially molding material of the stick-shaped molding materials supplied in the injection cylinder from solidification to a completely molten state; and
  a push-in shaft having a main portion and an operating portion that contacts the molding material, a width of the main portion being substantially the same as a width of the operating portion, the push-in shaft configured to push the molding material downward in the injection cylinder,
  wherein the molding material in the upper portion and an upper end of the lower portion of the injection cylinder remains solidified and the molding material in the lower end of the lower portion of the injection cylinder is completely molten,
  when the push-in shaft is inserted into the injection cylinder and the solidified molding material in the upper portion and the upper end of the lower portion of the injection cylinder is pushed by the push-in shaft, a gap is formed between an outer surface of the push-in shaft and an inner surface of the injection cylinder and the completely molten molding material in the lower end of the lower portion of the injection cylinder is injected such that an airtight stopper is formed in a space between the molding material in a middle level of the lower portion of the injection cylinder and the inner surface of the injection cylinder at the middle level due to a half-molten state of the molding material in the middle level of the injection cylinder, and
  heat is transmitted from the injection cylinder to the mold through a nozzle touch from the nozzle.

2. The injection molding apparatus according to claim 1, wherein the push-in shaft includes a centering mechanism.

3. The injection molding apparatus according to claim 2, wherein the push-in shaft includes an upper-side shaft and a lower-side shaft, with the lower-side shaft entering into a lower, cylindrical portion of the lower-side shaft from the lower end, and being supported to the upper-side shaft such that the lower-side shaft moves freely in a horizontal direction and a vertical direction relatively to the upper-side shaft, and the lower-side shaft being elastically fit into a low end side of the upper-end shaft in a radial direction.

4. The injection molding apparatus according to claim 1, further comprising an ejector mechanism, the ejector mechanism including:
 a guide rod having a pair of wheels provided on right and left both sides thereof;
 an ejector pin configured to rise by the rising of the guide rod;
 a rear stopper plate fixed to a lower-side mold attachment board and abutting on the rear side of the guide rod; and
 a guide path having a pair of inclined paths provided in parallel right and left and a concave portion provided therebetween,
 wherein, when the guide rod is pushed by the rear stopper plate from the rear side, the wheels climb up while rolling on the inclined paths so that the guide rod rises with respect to the rear stopper plate, whereas the rear stopper plate itself enters the concave portion.

5. The injection molding apparatus according to claim 1, wherein the push-in shaft comes down by manual operation of a push-in lever.

6. The injection molding apparatus according to claim 5, wherein a reservoir is provided below a gate of the upper-side mold, and
 a piston biased upward is housed in the reservoir.

7. The injection molding apparatus according to claim 1, in which part around the gate of the mold and part around a concave portion of the lower-side mold are made of a material having a relatively good heat retaining property, and other parts are made of a material having a relatively good heat radiation property.

8. A stick-shaped molding material to be supplied to an injection cylinder of an injection molding apparatus according to claim 1, the molding material having an approximately columnar shape,
 wherein a plurality of concave grooves extending in an axis line direction are formed on an outer peripheral surface thereof.

9. The stick-shaped molding material according to claim 8, wherein a volume of the molding material is adjusted to correspond to a volume of a piece of final molding.

\* \* \* \* \*